(12) United States Patent
Rubio et al.

(10) Patent No.: US 9,623,417 B2
(45) Date of Patent: *Apr. 18, 2017

(54) WATER AND ENERGY SAVING PROCESS FOR MAKING WHOLE GRAIN AND WHOLE GLUTEN-FREE GRAIN FLOUR

(71) Applicant: INVESTIGACION TECNICA AVANZADA S.A. DE C.V., Guadalupe (MX)

(72) Inventors: Felipe A. Rubio, Edinburg, TX (US); Manuel J. Rubio, Miami Beach, FL (US); Roberto Contreras M., Guadalupe (MX)

(73) Assignee: INVESTIGACION TECNICA AVANZADA S.A. DE C.V., Guadalupe (MX)

( * ) Notice: Subject to any disclaimer, the term of this patent is extended or adjusted under 35 U.S.C. 154(b) by 0 days.

This patent is subject to a terminal disclaimer.

(21) Appl. No.: 14/577,109

(22) Filed: Dec. 19, 2014

(65) Prior Publication Data

US 2016/0175844 A1 Jun. 23, 2016

(51) Int. Cl.
*B02B 5/02* (2006.01)
*B02B 1/04* (2006.01)
*B02B 1/08* (2006.01)
*A23L 7/10* (2016.01)
*B02C 13/00* (2006.01)

(52) U.S. Cl.
CPC ...... *B02B 5/02* (2013.01); *A23L 7/10* (2016.08); *B02B 1/04* (2013.01); *B02B 1/08* (2013.01); *B02C 13/00* (2013.01); *Y02P 60/15* (2015.11)

(58) Field of Classification Search
CPC .... B02B 1/00; B02B 1/04; B02B 1/08; B02B 5/00; B02B 5/02
USPC ...... 241/8; 426/455, 460, 461, 462, 463, 464
See application file for complete search history.

(56) References Cited

U.S. PATENT DOCUMENTS

| 4,421,527 A | * | 12/1983 | Wason | A61Q 11/00 |
| | | | | 423/339 |
| 4,529,609 A | * | 7/1985 | Gaehring et al. | 426/532 |
| 4,888,180 A | * | 12/1989 | Wu | 426/618 |

(Continued)

FOREIGN PATENT DOCUMENTS

| EP | 1061818 | 12/2000 |
| WO | WO 99/37169 | 7/1999 |

(Continued)

OTHER PUBLICATIONS

Popplewell et al., "Simulation of Bimodal Size Distributions in Aggregation and Disintegration Processes", Chemical Engineering Progress Aug. 1989.

(Continued)

*Primary Examiner* — Walter A Moore
(74) *Attorney, Agent, or Firm* — Young & Thompson

(57) ABSTRACT

A water saving and energy saving process the continuous production of whole grain flour and whole gluten-free flour is provided. The process includes preconditioning wholegrain or seed with water and uses an energy efficient blanching treatment with saturated steam. The process also provides flour having a bimodal size mixture of material having improved viscosity. The whole grain and whole gluten-free flour can be used to prepare grain products and baked foods.

18 Claims, 9 Drawing Sheets

(56) References Cited

U.S. PATENT DOCUMENTS

| | | | |
|---|---|---|---|
| 6,326,045 B1 | 12/2001 | Rubio et al. | |
| 6,344,228 B1 * | 2/2002 | Rubio | A21D 8/02 426/463 |
| 6,423,355 B1 | 7/2002 | Lewis et al. | |
| 7,419,694 B2 | 9/2008 | Korolchuk | |
| 7,425,344 B2 | 9/2008 | Korolchuk et al. | |
| 8,017,172 B2 | 9/2011 | Arndt et al. | |
| 2002/0037352 A1 | 3/2002 | Messager et al. | |
| 2005/0095346 A1 | 5/2005 | Borders et al. | |
| 2006/0024407 A1 * | 2/2006 | Rubio et al. | 426/52 |
| 2006/0251791 A1 | 11/2006 | Rubio et al. | |
| 2007/0148318 A1 | 6/2007 | Rubio et al. | |
| 2007/0184175 A1 * | 8/2007 | Rubio et al. | 426/622 |

FOREIGN PATENT DOCUMENTS

| | | | |
|---|---|---|---|
| WO | WO 0067908 A1 * | 11/2000 | |
| WO | 2006118778 | 11/2006 | |
| WO | WO 2007/044943 | 4/2007 | |
| WO | WO 2009/094708 | 8/2009 | |

OTHER PUBLICATIONS

Popplewell et al., "An 'Erosion Index' to Characterize Fines Production in Size Reduction Process", Dept. of Food Engineering University of Massachusetts, Amherst, MA, 01003, Jul. 29, 1988.
International search report, dated Mar. 6, 2015, in corresponding International Application No. PCT/US2014/071553.

* cited by examiner

Viscoelastic temperature sweep of whole wheat snack dough at 1 Hz or 1/s, 1% strain-amplitude and 55% Moisture.

G' = elastic component in Pa

G" = viscous component in Pa.

Viscoelastic temperature sweep of whole wheat tortilla dough at 1 Hz or 1/s, 1% strain-amplitude and 55% Moisture.

G' = elastic component in Pa

G" = viscous component in Pa

Viscoelastic temperature sweep of Wheat Selecta® dough at 1 Hz or 1/s, 1% strain-amplitude and 55% Moisture.

G' = elastic component in Pa
    G" = viscous component in Pa

Viscoelastic temperature sweep of whole amaranth (gluten-free) dough at 1 Hz or 1/s, 1% strain-amplitude and 50% Moisture.

G' = elastic component in Pa

G" = viscous component in Pa

Viscoelastic temperature sweep of whole wheat dough at 1 Hz or 1/s, 1% strain-amplitude and 50% Moisture.

G' = elastic component in Pa
    G" = viscous component in Pa

WATER AND ENERGY SAVING PROCESS FOR MAKING WHOLE GRAIN AND WHOLE GLUTEN-FREE GRAIN FLOUR

BACKGROUND OF THE INVENTION

Field of the Invention

The present invention relates to a water saving and energy saving process for the continuous production of whole grain flour and whole gluten-free flour. More particularly, the present invention preconditions the soaked whole-grain with water, and uses an energy efficient blanching treatment with saturated steam during the manufacture of the whole grain and whole gluten-free flour for the preparation of whole grain products and baked foods.

Description of Related Art

Every day, the average person needs to consume enough food to provide around 2,150 dietetic calories or Kcal (9 MJ) of energy. The amount will vary depending on age, size and level of physical activity. Average food availability in low developing countries is below 2,030 calories per day per capita, and about 2,700 in nutrition transition countries. In developed countries, by contrast, it is around 3,750 calories and some of this excess has resulted in high levels of obesity and non-communicable chronic diseases. As populations become more urban and incomes rise, diets high in fat, sugar and animal protein replace more traditional diets that were high in complex carbohydrates and fiber. Ethnic cuisine (e.g., Mediterranean) and unique traditional cereal (amaranth, *sorghum*, rice, corn, wheat and legume (bean, lentil, chickpea) foods are being replaced by fast foods increasing their energy density. Bread making is one of the most ancient methods of cereal processing. Today, flat breads are still the dominant breads and are either unleavened (corn tortilla and wheat chapati) or leavened by microorganisms (wheat bread) or chemical agents (wheat tortilla). The flour may be prepared from grass seeds (cereal), legume and tubers.

The total energy-related costs as a share of the production cost vary widely for food products. For example, in the United States the energy-related costs as a proportion of the total crop production ranged from about 10% for oilseed soybean to about 31% for cereal corn. At present, renewable energy meets over 13% of global primary energy demand. Almost half of this energy comes from traditional sources of biomass used for cook processing. Process-oriented strategies can reduce the environmental impacts with the design and manufacture of sustainable foods.

Minimal processing technologies in the food industry are designed to limit the impact on nutritional and sensory quality while preserving the food without additives. Hydrothermal treatment, i.e., High-Temperature and Short-Time (HTST), is a milder process intended to partially gelatinize the starch and modify its physical properties without destroying granule structure while improving its stability under shear and heat processing. HTST treatment can be accomplished at low moisture (<35%) even at temperatures above the gelatinization temperature, yielding a harder granule (elastic property) after moist-heat treatment (Jacobs et al. 1998; Sair 1967). The existence of well-defined bimodal particle size distributions has been reported in food systems due to disintegration and aggregation processes having both shattering mechanisms (yielding a larger-size group of particles) and surface erosion mechanisms (yielding a smaller-size group of particles). Dominance of either mechanism is determined by the particle's properties and the physical features of the size reduction apparatus (i.e., the impact mill or attrition mill); the coarser the milling, the larger the size mode and harder the fraction in bimodal distributions (Popplewell et al. 1989; Aguilar et al. 1991).

Blanching is a thermal process where the grain or seed is heated for the purpose of inactivating enzymes, modifying texture (starch and protein), and preserving the color, flavor and nutritional value. Hot water and steam are commonly used heating media, but hot gas (dry-heat) has also been used. Steam infusion heating is a direct-contact process where condensation occurs on the surface of a flowable food, under atmospheric pressure. This process requires atmospheric steam, pumpable food and a mechanical device to facilitate the steam heating and condensation.

The cost for water use and its environmental treatment can affect sustainability in expanding cereal processing plants, particularly in areas where water supply is scarce. Also, low or zero-carbon energy technology with reduced energy-related emissions will contribute to the stabilization of greenhouse gas concentration levels.

Commercial rotary cooker/cooler and screw conveyor systems, using hot-water and steam-injection, have been designed to improve blanched food product quality (e.g., MULTI-TURBULENT® blancher, PPM Technologies Inc., Oregon, USA), energy conservation and waste reduction (Lyco VAPOR FLOW® and Lyco PRESSURE FLOW®; Thomas Conveyor Co, Texas, USA), and those disclosed in U.S. Pat. No. 3,778,521, U.S. Pat. No. 3,910,175, U.S. Pat. No. 5,289,759, U.S. Pat. No. 5,327,817, U.S. Pat. No. 6,263,785, and U.S. Pat. No. 7,348,036, and in EP 1061818 and WO 127922A1.

Although the above described methods can be useful in producing whole flour, an energy saving process for the continuous production of whole grain flour and whole gluten-free flour using preconditioning with water and efficient blanching with saturated steam was still unavailable in the field at the time of the present invention.

SUMMARY OF THE INVENTION

Accordingly, the present invention provides a departure from the prior art methods of processing whole grains in the production of whole grain flour and whole gluten-free flour. The method involves water preconditioning and steam blanching with reduced water input, reduced energy demand and reduced carbon dioxide emissions, but also provides a high yield of the desired end product.

Another objective of the invention is to use an industrial method and saturated steam blancher system to continuously produce coarse and fine material fractions yielding a whole grain flour, for example whole wheat flour. Another object of the invention is to use the industrial method and saturated steam blancher system to continuously produce coarse and fine material fractions yielding whole gluten-free flour.

Still another object of the invention is to provide whole grain flour and whole gluten-free flour for grain products and baked foods, wherein the flour is uniform and has improved biochemical and viscoelastic properties.

The above and other objects and advantages of the invention are achieved through a continuous process and apparatus applied to the production of whole grain flour, and/or whole gluten-free flour, embodiments of which include providing a cleaned grain or seed, mixing and preconditioning the grain or seed with water, and blanching the tempered kernel with saturated steam to effect a partial gelatinization and denaturation of the kernel without wastewater and with reduced energy usage; conditioning and cooling (tempering) the blanched kernel for efficient grinding; milling the tempered kernel into coarse grind and fine grind material fractions; hot-air drying the ground material; and sieving and classifying the fine grind material from the coarse grind material, while the remaining course grind material can be further remilled and resieved.

BRIEF DESCRIPTION OF THE DRAWINGS

The invention will be more fully understood from the description which follows, taken with reference to the appended drawings.

DETAILED DESCRIPTION OF THE INVENTION

The present process for producing whole grain flour is not limited and can be applied to any grain. The process can be applied to gluten cereals such as wheat (*Triticum* spp., soft, hard, durum and bulgur) and barley (*Hordeum* spp.), but also includes rye (*Secale* spp.) and oats (*Avena* spp.) within its scope. Other suitable pseudocereal grain includes buckwheat (*Fagopyrum* spp.).

Figure 1:
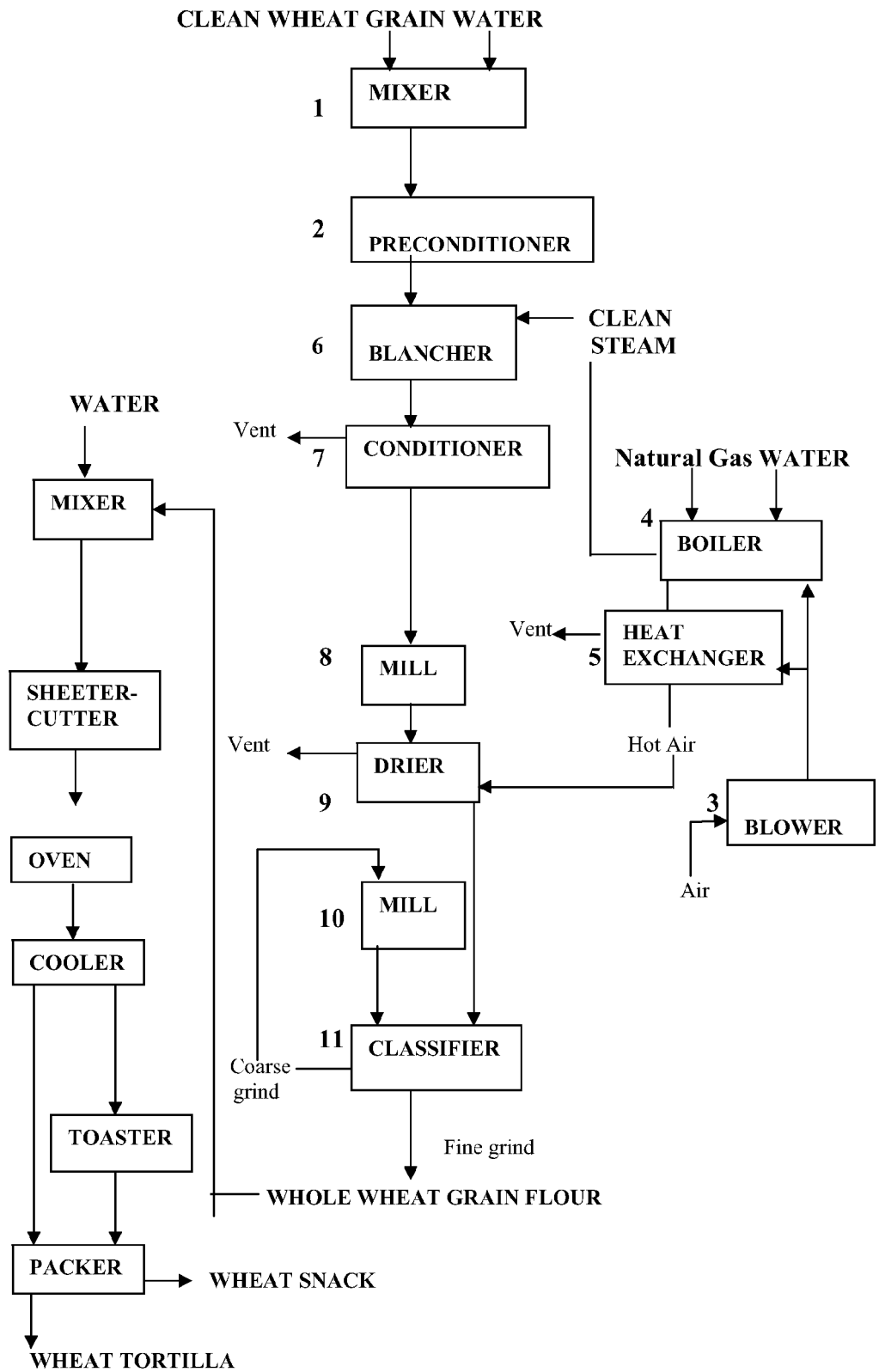
FIG. 1 is a flowchart that depicts an embodiment of the invention, illustrating a continuous process for producing whole wheat flour, and schematically depicting an associated apparatus and system.

The flowchart illustrated in FIG. 1, shows a mixer 1, a preconditioner 2 with a feeder, a blower 3, a boiler 4, a heat exchanger 5, a steam blancher 6, a conditioner 7 with a feeder, a mill 8, a drier 9, a mill 10, and a classifier 11, according to an embodiment of the present invention.

According to an embodiment of the method, whole grain, which has been freed of foreign material by dry cleaning, is fed to the mixer 1, where it is thoroughly sprayed with water for about 3 to 6 minutes to uniformly wet the grain surface. The grain moisture can be adjusted, for example from an initial grain moisture of about 10% to 15%, or about 12% to 13%, to an adjusted moisture of about 15% to 30%, preferably about 17% to 24%, while using a grain to water ratio of about 1.0:0.01 to 1.0:0.20, preferably a ratio of about 1:0.06 to 1:0.10.

According to one embodiment, the cleaned whole grain is intact and has not been subjected to any physical action or physical shock (e.g., rolling or flattening) that would induce fissures or cracks in the grain, prior to being sprayed with the water.

According to an embodiment, the water sprayed on the grain can contain a solute, such as a salt or a sugar. In another embodiment, the water does not contain any solute and consists or consists essentially of water.

The wet grain kernel is then fed to the preconditioner 2, wherein the soaked kernel is tempered for about 10 to 60 minutes, preferably about 20 to 40 minutes, at ambient temperatures or temperatures of about 25° C. to 30° C. The tempering allows the water to transfer evenly among the grains and to be adsorbed and infused into the outer layers of the grain.

After completing the preconditioning step, the moisturized and tempered grain kernel is transferred to the steam blancher 6, e.g., an industrial steam blancher whose design is known per se, wherein saturated steam coming from the boiler 4 is supplied to the tempered grain. The steam is applied to the grain throughout the blancher, and this step can utilize, for example, a rotary cylinder chamber or screw conveyor system. Clean steam is generated from water in the boiler 4, whereby a fuel, such as natural gas, and clean air is supplied from the blower 3.

According to an embodiment, the steam can contain a solute, such as a salt or a sugar. In another embodiment, the steam does not contain any solute and consists or consists essentially of water.

This steam blanching step effectively infuses the exposed surfaces of the grain constantly to the water vapor treating medium so that the kernel is uniformly heated and hydrated with steam condensate. The steam blanching can take place for a time period of about 1 to 20 minutes, preferably for about 5 to 10 minutes, and at a temperature of about 75° C. to 100° C., preferably from about 85° C. to 98° C. This affects moisture reabsorption of the grain by an additional 4% to 15%, or about 6% to 10%, for a final moisture of the grain of about 20% to 35%, preferably about 26% to 30%.

The steam absolute pressure is about 90 kPa to 120 kPa, preferably about 93.8 kPa to 112.4 kPa, and can be used to control the saturated steam temperature for a desired time. This steaming step (i.e., minimally processed blanching) in the near boiling temperature range effects a partial gelatinization of the starch granules of the most external layers (i.e., the bran or hull), and partial denaturation of the internal layers (i.e., endosperm/germ) in the cereal grain. Preserving the bran and/or hull components increases the micronutrients and phytochemicals in the resulting whole grain, which will increase its food value.

The steam blanched and hydrated kernel is then passed to the conditioner 7, wherein the kernel is tempered for about 20 to 90 minutes, preferably about 40 to 60 minutes, and at a temperature of about 50° C. to 90° C., preferably from about 65° C. to 85° C., to effect not only a low-moisture conditioning but also a cooling step. The kernel can be cooled, for example, by venting the water vapor from the grain surface.

In distinction from prior art processes, this low-moisture conditioning enhances the subsequent mechanical milling steps because there remains a harder outer surface on the kernel and its moisture content is more nearly uniform. During the low-moisture conditioning, the moisture range of the kernel may decrease, for example to about 25% to 28%. At this moisture range, the conditioned and cooled grain remains hard enough to be milled more efficiently than a higher moisture and more elastic grain (i.e., more resistance to breakage), while on the other hand, the grain is sufficiently elastic to avoid excess accumulation of undesired "dust" particles, which are too fine for making whole flour suitable for baked foods.

The conditioned and cooled kernel is then passed through the mill 8, such as an impact mill (i.e., a hammer mill or turbo mill) at a temperature about 40° C. to 80° C., preferably about 50° C. to 70° C. The milling not only shatters the grain but also erodes the grain into two fractions, namely, a small-sized material and a larger-sized material. The milling operation preferably produces a fine-material (erosion) having a bimodal size distribution and a coarser-material (shattering). The small-sized mode (and softer fraction) is known as the fine-grind material, while the larger-sized mode (and harder fraction) is described as the coarse-grind material, according to the bimodal size distribution. The fine-grind material can be used to produce baked products (e.g., tortilla or chapati), while the coarse-grind material can be used for the preparation of snack foods (e.g., chips or crisps).

The milled material is then passed through the drier 9, whose design is known per se, such that it is mixed with clean hot air coming from the heat exchanger 5. Clean air from the blower 3 is heated by waste hot air from the boiler 4 and vented exhaust air (95° C. to 105° C.). The milled material is thereby dried at temperatures of about 100° C. to 200° C., preferably about 130° C. to 170° C., for a short time of less than 5 seconds, preferably about 0.5 to 1 second. The hot moist air is vented (75° C.-100° C. with 13% to 15% moisture). The whole milled material is dried to yield a moisture content of about 5% to 15%, or about 9% to 11%, depending on the desired bimodal particle size for baked and/or snack food products.

The dried milled material is directed to the classifier 11 with appropriate sized screens (e.g., under 45 US mesh and above 230 US mesh) wherein the small-size mode or fine-grind material is segregated as whole flour (about 65% to 75% of the total weight of incoming grain). Preferably, the large-size mode or coarse-grind material (about 25% to 35% of the total weight) can be recycled to the mill 10 and thereafter further ground for size reduction or attrition to the small-size mode or fine-grind material.

Tables 1 and 2 show a typical biochemical and physico-chemical composition for snack and tortilla whole wheat flour (WWF) produced according to the invention versus dehulled and degermed wheat flour produced by conventional methods (SELECTA®) with 10% moisture.

TABLE 1

Biochemical content (g/100 g)

| Nutrient | Snack WWF | Tortilla WWF | Selecta® |
|---|---|---|---|
| Water | 10.0 | 10.0 | 10.0 |
| Protein | 11.5 | 9.8 | 13.6 |
| Fat | 1.7 | 2.5 | 1.1 |
| Ash | 1.5 | 1.6 | 0.7 |
| Calcium | 0.035-0.045 | 0.035-0.045 | 0.020-0.035 |
| Dietary fiber: | 10.5 | 9.9 | 2.2 |
| Crude fiber | 2.5 | 2.4 | 0.4 |
| Gliadin (R-5 Elisa: 0.6 ppm detection limit) | (>70) | (>50) | (>100) |
| Starch | 64.8 | 66.2 | 72.4 |
| Total Calories: | 319 | 324 | 353 |

TABLE 2

Physico-chemical properties

| Property | Snack WWF | Tortilla WWF | Selecta® |
|---|---|---|---|
| Moisture (%) | 10.0 | 10.0 | 10.0 |
| Yield | 1700-1850 | 2150-2170 | 1500-1600 |

TABLE 2-continued

Physico-chemical properties

| | Snack WWF | Tortilla WWF | Selecta® |
|---|---|---|---|
| (g-dough/1000 g) | | | |
| Adhesivity | 0.5 | 0.4 | 0.3 |
| pH (11% solids) | 6.0 | 6.0 | 6.0-6.5 |
| Apparent viscosity (RVA 4-14% solids) | | | |
| Peak (cps/95° C.) | 3270 | 6460 | 7640-8540 |
| Final (cps/50° C.) | 4170 | 7000 | 7160-8120 |
| Particle Size Distribution (% over) | Bimodal | Bimodal | |
| US Mesh 35 (500μ) | 0.0 | 0.0 | 0.0 |
| US Mesh 45 (355μ) | 0.2 | 0.0 | 0.0 |
| US Mesh 60 (250μ) | 14.7 | 0.6 | 0.0 |
| US Mesh 80 (180μ) | 11.5 | 9.2 | 4.0 |
| US Mesh 100 (150μ) | 7.6 | 12.2 | 2.7 |
| US Mesh 200 (74μ) | 18.0 | 9.4 | 31.9 |
| US Mesh 230 (63μ) | 48.0 | 68.6 | 61.4 |

As shown by the results in Table 1, the whole wheat flour (WWF) produced according to an embodiment of the present method has more dietary fiber and crude fiber, and less protein and starch, compared to the dehulled/degermed wheat flour (SELECTA®). In addition, the present method provides a functional change to the WWF, yielding a bimodal particle size distribution (e.g. modes: 150-250 micron and 63 micron) compared to the unimodal size distribution of the SELECTA® flour (mode: 63 micron), as shown in Table 2. This also provides a peak apparent viscosity that is lower in the bimodal WWF compared to the unimodal SELECTA® flour.

Figure 2:
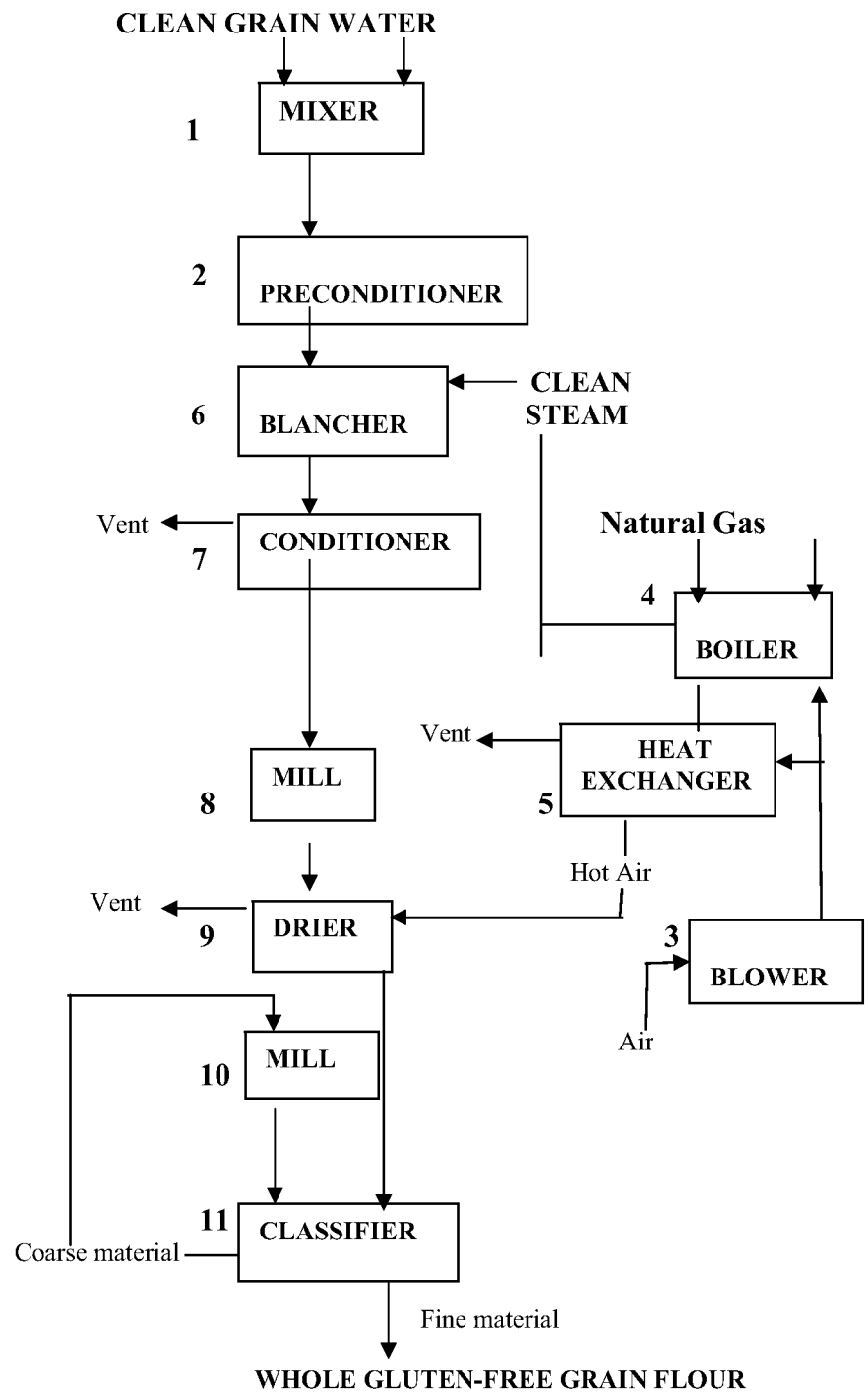
FIG. 2 is a flowchart that depicts another embodiment of the invention, illustrating a continuous process for producing whole gluten-free flour, and schematically depicting an associated apparatus and system.

The present process for producing whole gluten-free flour is not limited and can be applied to non-gluten cereals such as sorghum (*Sorghum* spp.) and rice (*Oryza* spp.), but also includes pseudocereals such as amaranth (*Amaranthus* spp.) and quinoa (*Chenopodium* spp.) within its scope. Other suitable seeds include legumes such as bean (*Phaseolus* spp.), lentil (*Lens* spp.), chickpea (*Cicer* spp.), and combinations thereof. FIG. 2 shows a mixer 1; a preconditioner 2 with a feeder; a blower 3; a boiler 4, a heat exchanger 5, an steam blancher 6; a conditioner 7 with a feeder; a mill 8; a drier 9; a mill 10; and a classifier 11, according to an embodiment of the invention for producing whole gluten-free flour.

According to this embodiment, whole grain or seed, which has been freed of foreign material by dry cleaning, is fed to the mixer 1, where it is thoroughly sprayed with water for about 1 to 5 minutes to uniformly wet the grain or seed surface. The grain moisture is adjusted, starting from about 10% to 15%, or about 12% to 13%, to about 15% to 30%, preferably about 20% to 24%, while using a grain to water ratio of about 1.0:0.04 to 1.0:0.2, preferably about 1:0.08 to 1:0.10.

According to one embodiment, the cleaned whole grain or seed is intact and has not been subjected to any physical action or physical shock (e.g., rolling or flattening) that would induce fissures or cracks in the grain or seed, prior to being sprayed with the water.

According to an embodiment, the water sprayed on the grain or seed can contain a solute, such as a salt or a sugar. In another embodiment, the water does not contain any solute and consists or consists essentially of water.

The wet grain or seed is then fed to the preconditioner 2, wherein the soaked seed is tempered for about 10 to 90 minutes, preferably about 20 to 60 minutes, at ambient temperatures or about 25° C. to 30° C. The tempering allows the water to transfer evenly among the seeds and to be adsorbed and infused into the outer layers of the seed.

After completing the preconditioning step, the moistened and tempered grain or seed is transferred to the steam blancher 6, e.g., an industrial steam blancher whose design is known per se, wherein saturated steam from the boiler 4 is supplied to the tempered seed throughout the blancher (e.g., a rotary cylinder chamber or screw conveyor system). Clean steam is generated from water in the boiler 4, whereby a fuel, such as natural gas, and clean air is supplied from the blower 3. This effectively infuses every exposed surface of the grain constantly to the water vapor treating medium, so that the seed is uniformly heated and hydrated with steam condensate. The steam blanching can take place for a time period of about 1 to 20 minutes, preferably for about 5 to 15 minutes, and at a temperature of about 75° C. to 100° C., preferably from about 85° C. to 98° C. This affects a moisture reabsorption of about 4% to 15%, or about 6% to 12%, to produce a final moisture content of about 25% to 38%, preferably about 29% to 33%.

The steam absolute pressure is about 90 kPa to 120 kPa, preferably about 93.8 kPa to about 112.4 kPa, and can be used to control the saturated steam temperature for a desired time. This steaming step (i.e., minimally processed blanching) in the near boiling temperature range can effect a partial gelatinization of the starch granules of the most external layers (i.e., the bran or hull) and a partial denaturation of the most internal layers (i.e., the endosperm/germ or cotyledon) in the cereal grain or legume seed.

The blanched and hydrated grain or seed is then passed to the conditioner 7, wherein the grain/seed is tempered for about 15 to 90 minutes, preferably about 30 to 60 minutes, and at a temperature of about 50° C. to 90° C., preferably about 65° C. to 85° C., to effect not only a low-moisture conditioning but also a cooling step. The grain/seed can be cooled, for example, by venting the water vapor from the grain/seed surface.

In distinction from prior art processes, this low-moisture conditioning enhances the subsequent mechanical milling steps because there is a harder outer surface on the grain or seed, and its moisture content is more nearly uniform. During the low-moisture conditioning, the moisture range of the grain/seed may decrease, for example to about 27% to 31%. At this moisture range, the conditioned and cooled grain/seed remains hard enough to be milled more efficiently than that of a higher moisture and more elastic grain/seed (i.e., more resistance to breakage), while on the other hand, the grain/seed is sufficiently elastic to avoid excess accumulation of "dust" particles, which are too fine for making whole flour suitable for producing baked food products.

The conditioned and cooled kernel is passed through the mill 8, such as an impact mill (i.e., a hammer mill or turbo mill) at a temperature about 40° C. to 80° C., preferably about 50° C. to 70° C., which not only cracks but also erodes the grain/seed into two fractions, namely, a small-sized material and a larger-sized material. The milling operation preferably produces a fine-material (erosion) having a bimodal size distribution and a coarser-material (shattering). The small-sized mode (and softer fraction) is known as the fine-grind material, while the large-sized mode (and harder fraction) is described as the coarse-grind material, according to a bimodal size distribution. The fine-grind material can be used to produce baked products (e.g., tortilla or chapati), while the coarse-material can be used for the preparation of snack foods (e.g., chips or crisps).

The milled material is then passed through the drier 9, whose design is known per se, such that it is mixed with clean hot air coming from the heat exchanger 5. Clean air from the blower 3 is heated by waste hot air from the boiler 4 and vented exhaust air (95° C. to 105° C.). The milled material is thereby dried at low temperatures of about 100° C. to 220° C., preferably about 130° C. to 190° C., for a short time of less than 5 seconds, preferably about 0.5 to 1 second. The hot moist air is vented (75° C.-100° C. with about 15% to 17% moisture). The whole, gluten-free, milled material is dried to yield a moisture content of about 5% to 15%, or about 9% to 11%, depending on the desired bimodal particle size for baked and/or snack food products.

The dried milled material is directed to the classifier 11 with appropriate sized screens (e.g., under 35 US mesh, above 230 US mesh) wherein the small-size mode or fine-grind material is segregated as whole flour (about 65% to 75% of the total weight of incoming grain). Preferably, the large-size mode or coarse-grind material (about 25% to 35% of the total weight) is recycled to the mill 10 and thereafter further ground for size reduction or attrition to the small-size fine-grind material. This reground material is then further sieved.

Tables 3 and 4 show a typical biochemical and physico-chemical composition for bean and amaranth whole gluten-free flour (WGFF) produced according to the invention versus whole wheat flour (WWF).

TABLE 3

Biochemical content (g/100 g)

| Nutrient | Amaranth WGFF | Bean WGFF | Wheat WWF |
| --- | --- | --- | --- |
| Water | 10.0 | 10.0 | 10.0 |
| Protein | 15.0 | 23.8 | 9.8-13.3 |
| Fat | 5.5 | 0.9 | 1.8-2.5 |
| Ash | 2.6 | 3.5 | 1.6-1.7 |
| Calcium | 0.165-0.290 | 0.050-0.125 | 0.035-0.045 |
| Dietary fiber: | 9.4 | 15.2 | 9.9-10.8 |
| Crude fiber | 3.1 | 3.8 | 2.4-2.6 |
| Gliadin (R-5 Elisa: 0.6 ppm detection limit) (Gluten-free content is <20 ppm: Codex Alimentarius CX/NFSDU00/4) | (13) | (12) | (>50-70) |
| Starch | 57.5 | 46.6 | 66.2-62.4 |
| Total Calories: | 334 | 289 | 324-317 |

TABLE 4

Physico-chemical properties

| Property | Amaranth WGFF | Bean WGFF | Wheat WWF |
| --- | --- | --- | --- |
| Moisture (%) | 10.0 | 10.0 | 10.0 |
| Yield (g-dough/1000 g) | 1500-1950 | 2000-2250 | 1300-1600 |
| Adhesivity | 0.9 | 0.6 | 0.3 |
| pH (11% solids) | 6.0-6.5 | 6.0-6.5 | 6.0-6.5 |
| Apparent viscosity (RVA 4-14% solids) | | | |
| Peak (cps/95° C.) | 4310 | 2570 | 7640 |
| Final (cps/50° C.) | 3130 | 5250 | 7160 |
| Particle Size Distribution (% over) | Bimodal | Bimodal | Bimodal |

TABLE 4-continued

Physico-chemical properties

|  | Amaranth WGFF | Bean WGFF | Wheat WWF |
|---|---|---|---|
| US Mesh 35 (500μ) | 0.0 | 0.0 | 0.0 |
| US Mesh 45 (355μ) | 0.0 | 0.2 | 0.2 |
| US Mesh 60 (250μ) | 13.8 | 1.3 | 14.7 |
| US Mesh 80 (180μ) | 16.8 | 4.8 | 11.5 |
| US Mesh 100 (150μ) | 9.8 | 4.2 | 7.6 |
| US Mesh 200 (74μ) | 50.6 | 74.5 | 18.0 |
| US Mesh 230 (63μ) | 9.0 | 15.0 | 48.0 |

As shown by the results in Tables 3 and 4, the whole gluten-free flour (WGFF) produced from beans and amaranth according to embodiments of the present method generates a higher dough yield compared to the whole wheat flour (WWF) even though the WGFF has less starch content. For example, as shown in Table 4, the WGFF generated about 20% to 45% higher dough yield (at 25° C.) compared to the WWF. As shown in Table 3, the gluten-free flour contains lower amounts of gliadin (<13 ppm) than the wheat flour (>50 ppm gliadin). Gliadin is rich in proline and glutamine and represents a major component of gluten. Also shown in Table 4, the present method produces WGFF having a bimodal particle size distribution, and the peak apparent viscosity is lower in the WGFF, than the WWF.

The whole grain flour produced according to the invention may be rehydrated by mixing the flour with water, for instance at about a 1:0.7 to 1:1.15 ratio, to form a whole grain dough with about 40% to 55% moisture content, having a firm (elastic) and cohesive (viscous) property, and with enough stickiness (surface property) for example, for a baked tortilla or chapati (about 30% to 40% moisture content) or a dehydrated snack product (about 1.5% to 3% moisture content).

Figure 3A:
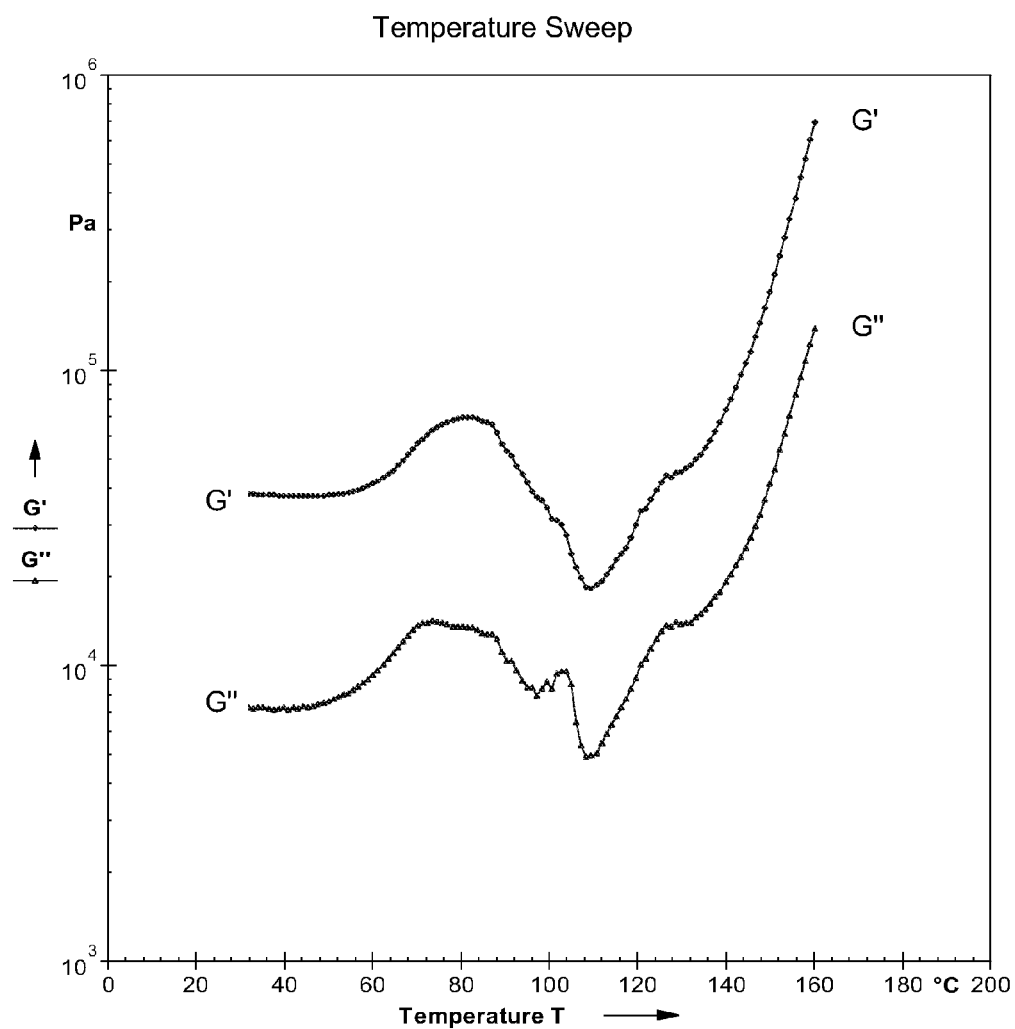
FIGS. 3A, 3B and 3C are graphs showing the viscoelastic temperature sweep (elasticity G' and viscosity G" components from 20° C. to 160° C.) of whole wheat snack dough (3A) and whole wheat tortilla dough (3B) produced according to the invention versus dehulled and degermed wheat dough (3C).
Figure 3B:
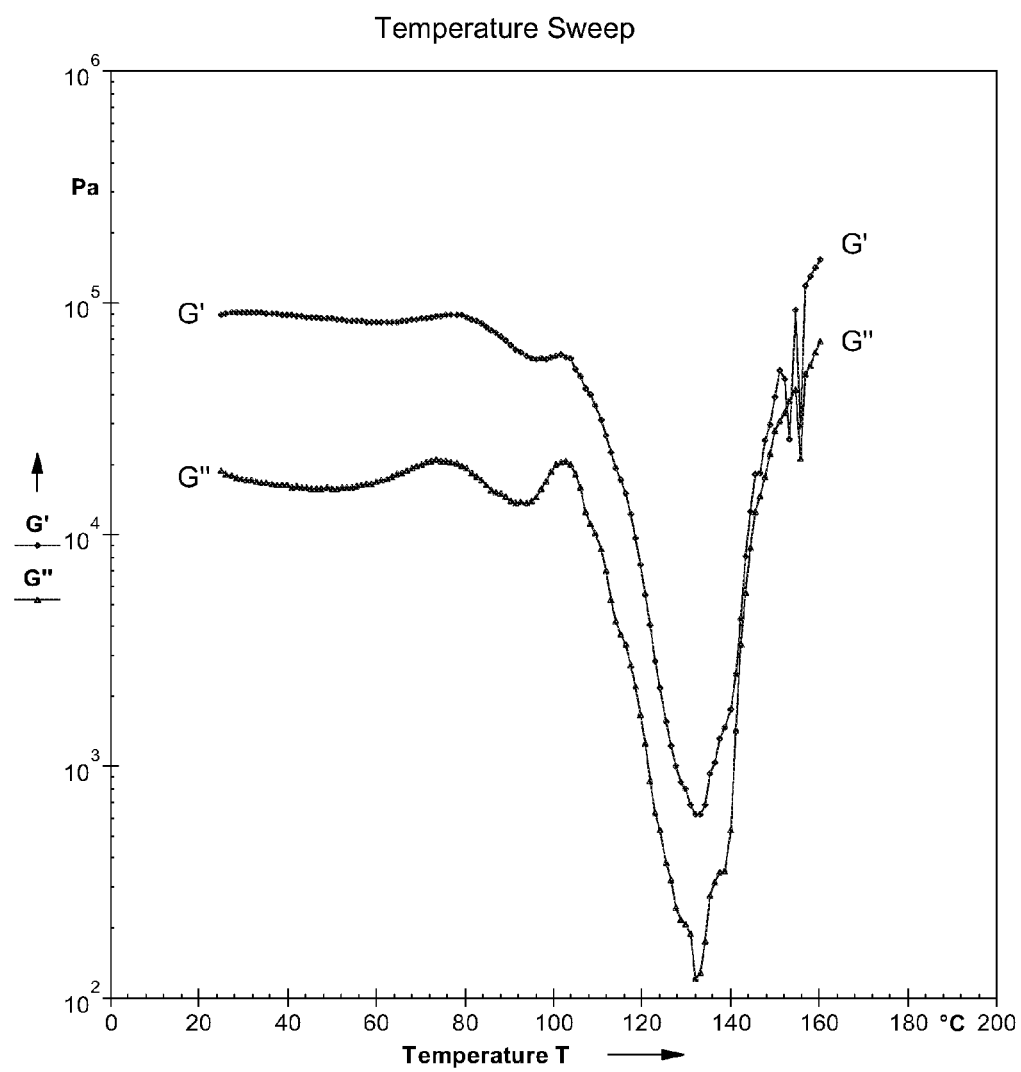
Figure 3C:
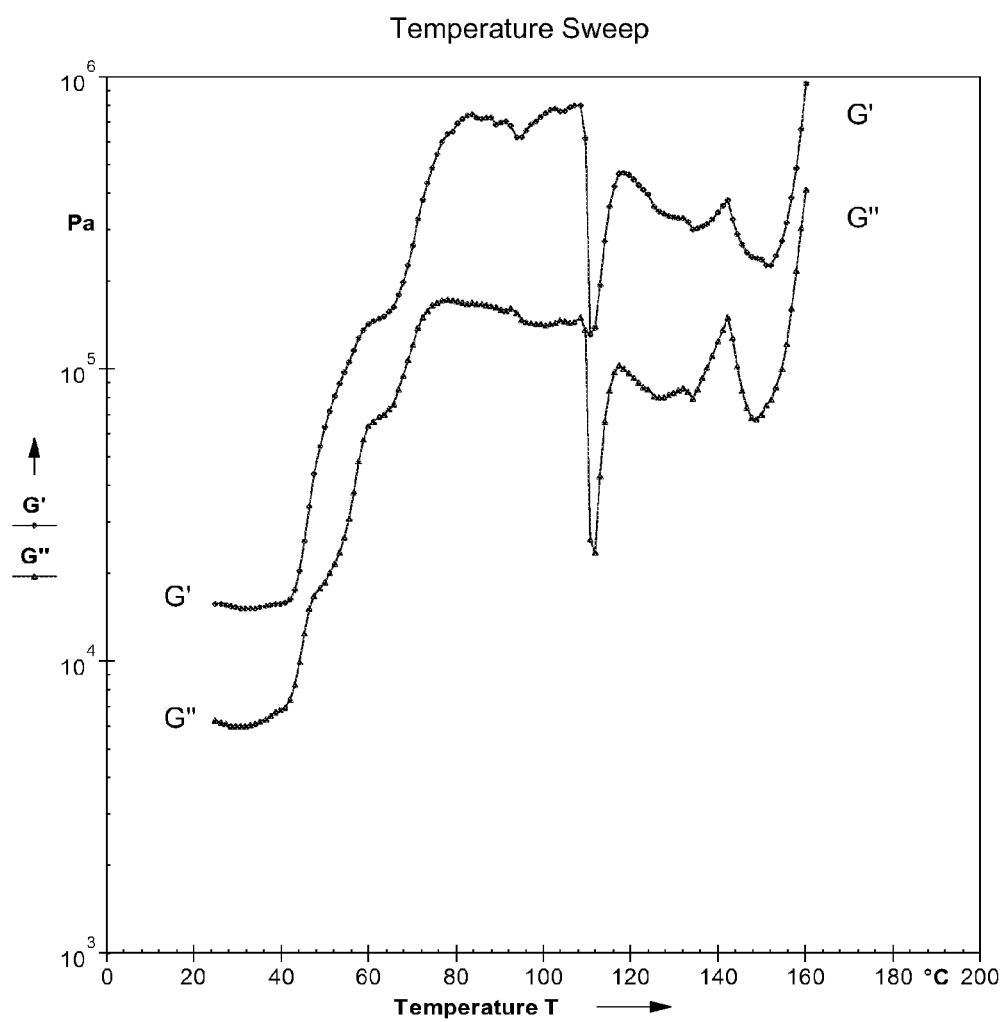

FIGS. 3A, 3B, and 3C show a viscoelastic temperature sweep from 20° C. to 160° C. of whole wheat snack dough (3A) and whole wheat tortilla dough (3B) produced according to the invention, versus conventional dehulled and degermed wheat dough (SELECTA®) (3C), with 55% moisture content.

When the whole wheat flour was mixed with water, both starches and proteins became hydrated, but they did not expand as in dough baking where a denatured protein can cross-link with a gelatinized starch. In the whole wheat dough prepared with the whole wheat flour according to the present invention, having a lower elastic (G') and viscous (G") moduli (3A & 3B), it was shown that flour water absorption was increased as compared to the conventional dehulled and degermed wheat dough (3C). The finer the bimodal particle size in the whole wheat tortilla flour dough (3B), the higher the elastic and viscous moduli during the starch gelatinization and protein denaturation temperature range (60° C. to 80° C.).

The whole gluten-free flour produced according to the invention may be rehydrated by mixing the flour with water, for instance at about a 1:0.9 to about a 1:1.25 ratio, to form a whole gluten-free dough (from 50% to about 55% moisture content) with a firm (elastic) and cohesive (viscous) property, and with enough stickiness (surface property) for example, for a baked food product (about 30% to 45% moisture) or a grain snack product (about 1.5% to 3% moisture).

Figure 4A:
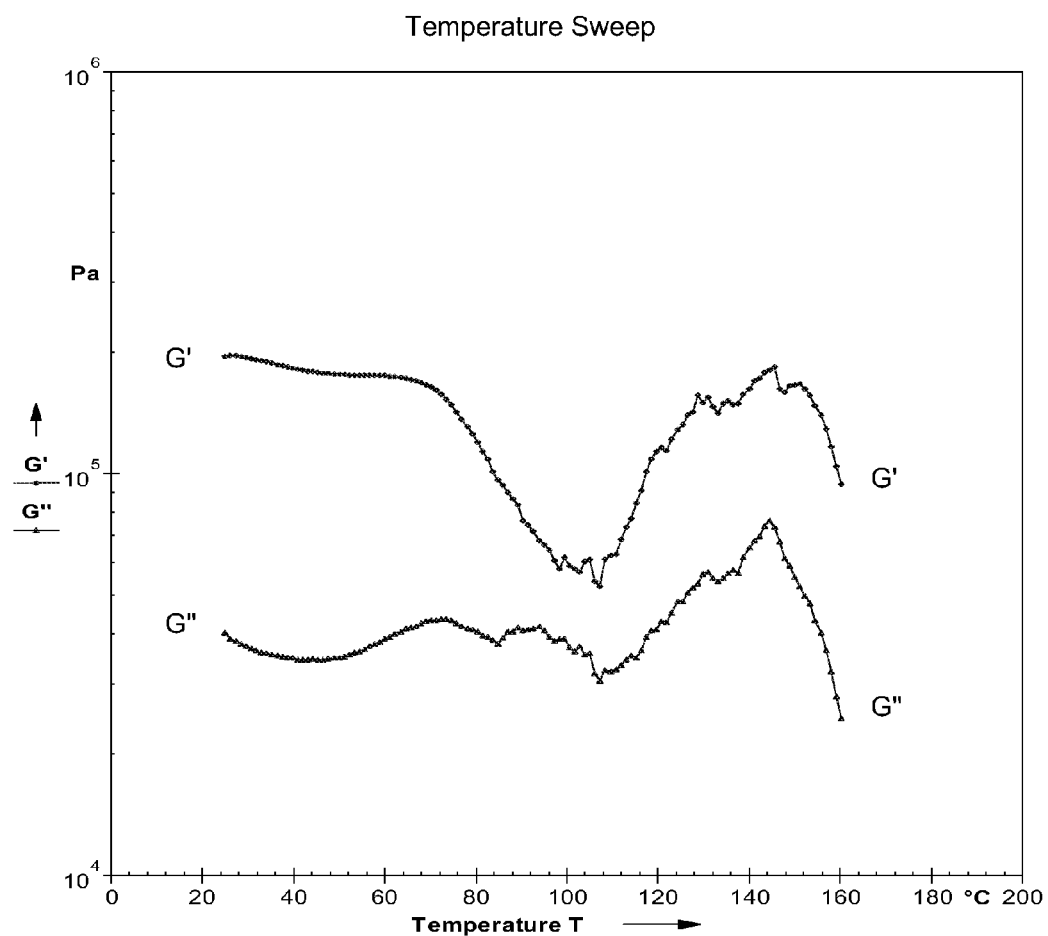
FIGS. 4A and 4B are graphs showing the viscoelastic temperature sweep (elasticity G' and viscosity G" components from 20° C. to 160° C.) of whole gluten-free dough produced according to the invention (4A) versus whole wheat dough (4B).
Figure 4B:
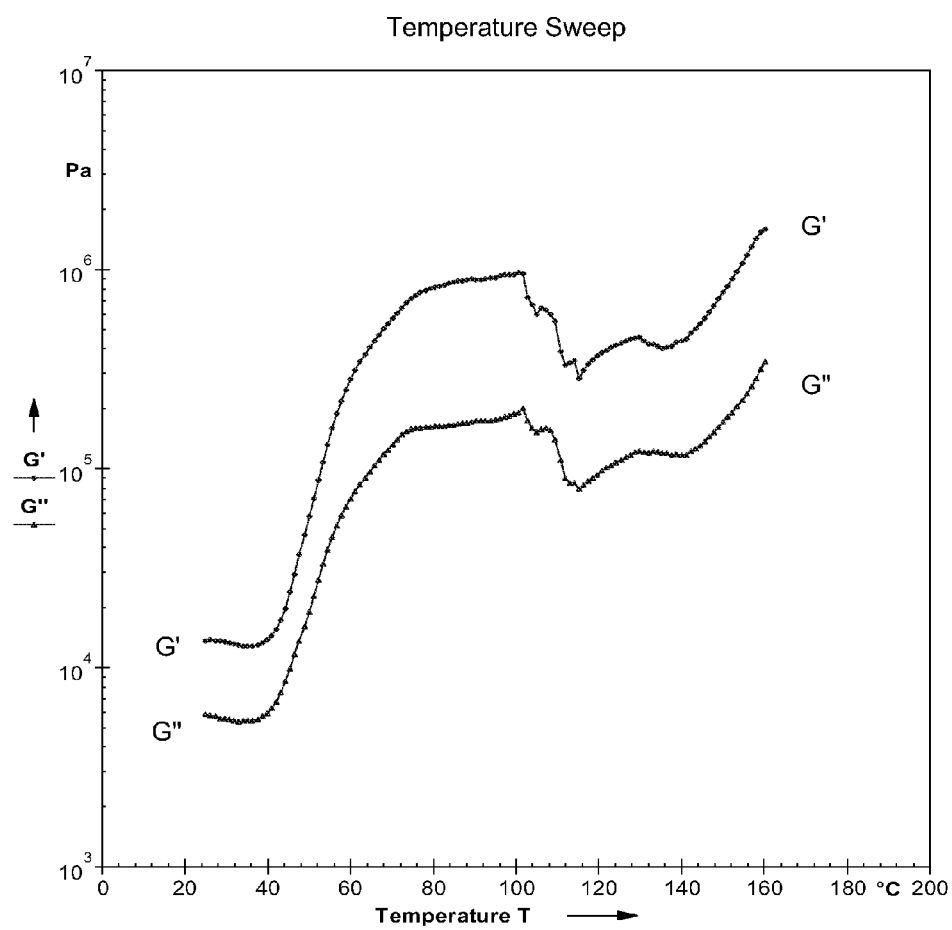

FIGS. 4A and 4B show a viscoelastic temperature sweep from 20° C. to 160° C. of whole gluten-free amaranth dough prepared according to the present invention (4A) versus conventional whole wheat dough (4B), with 50% moisture content. In the gluten-free dough, a lower elastic (G') and viscous (G") moduli was found with a higher flour water absorption. The coarser the bimodal particle size in the whole gluten-free flour dough (4A), the lower the elastic and viscous moduli during the starch gelatinization and protein denaturation temperature range (60° C. to 70° C.).

Figure 5A:
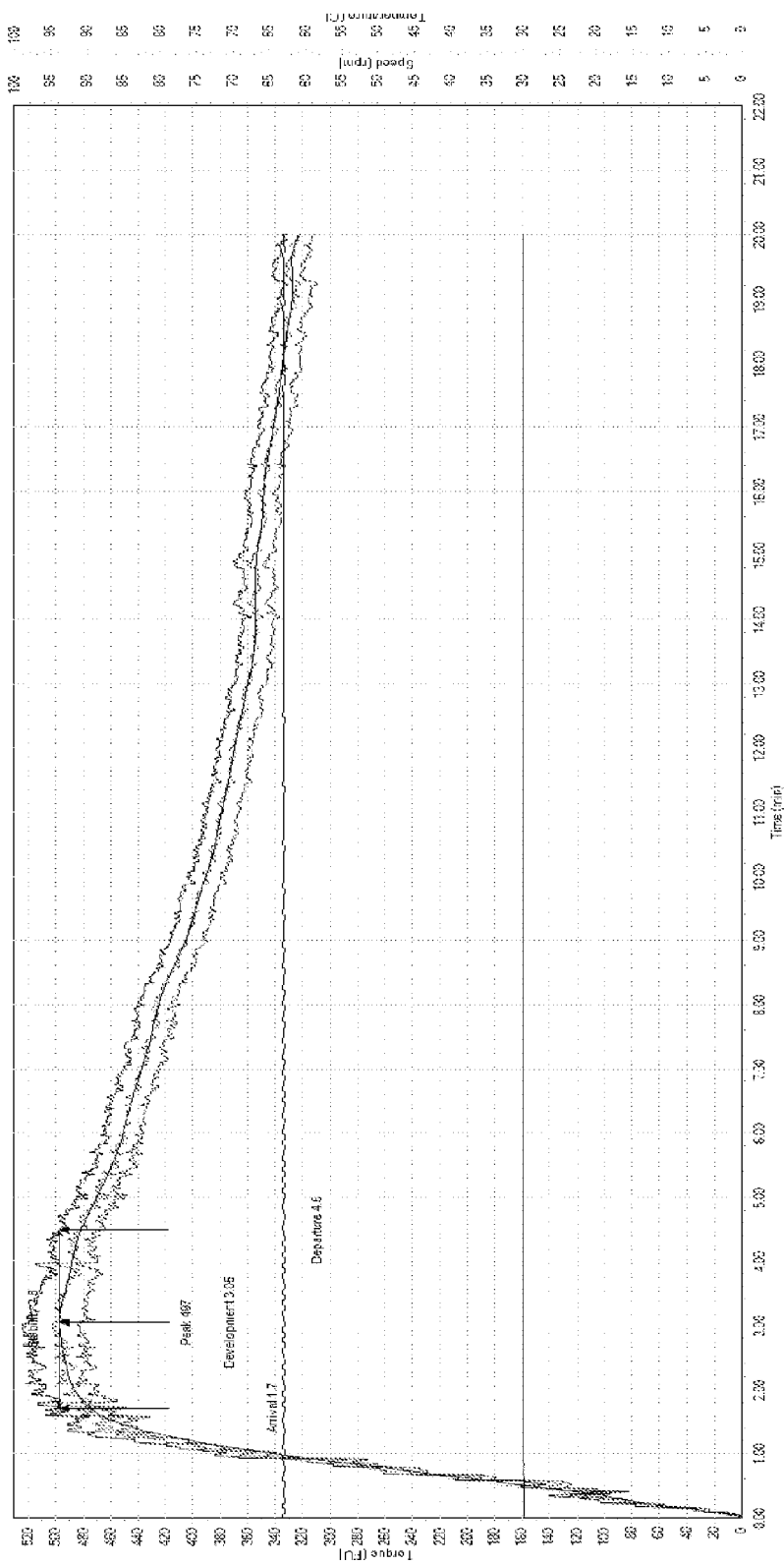
FIGS. 5A and 5B are Farinographs and flour water absorption results (dough viscosity at 30° C.) of whole wheat tortilla flour produced according to the invention (5A) versus conventional dehulled and degermed wheat flour (5B).
Figure 5B:
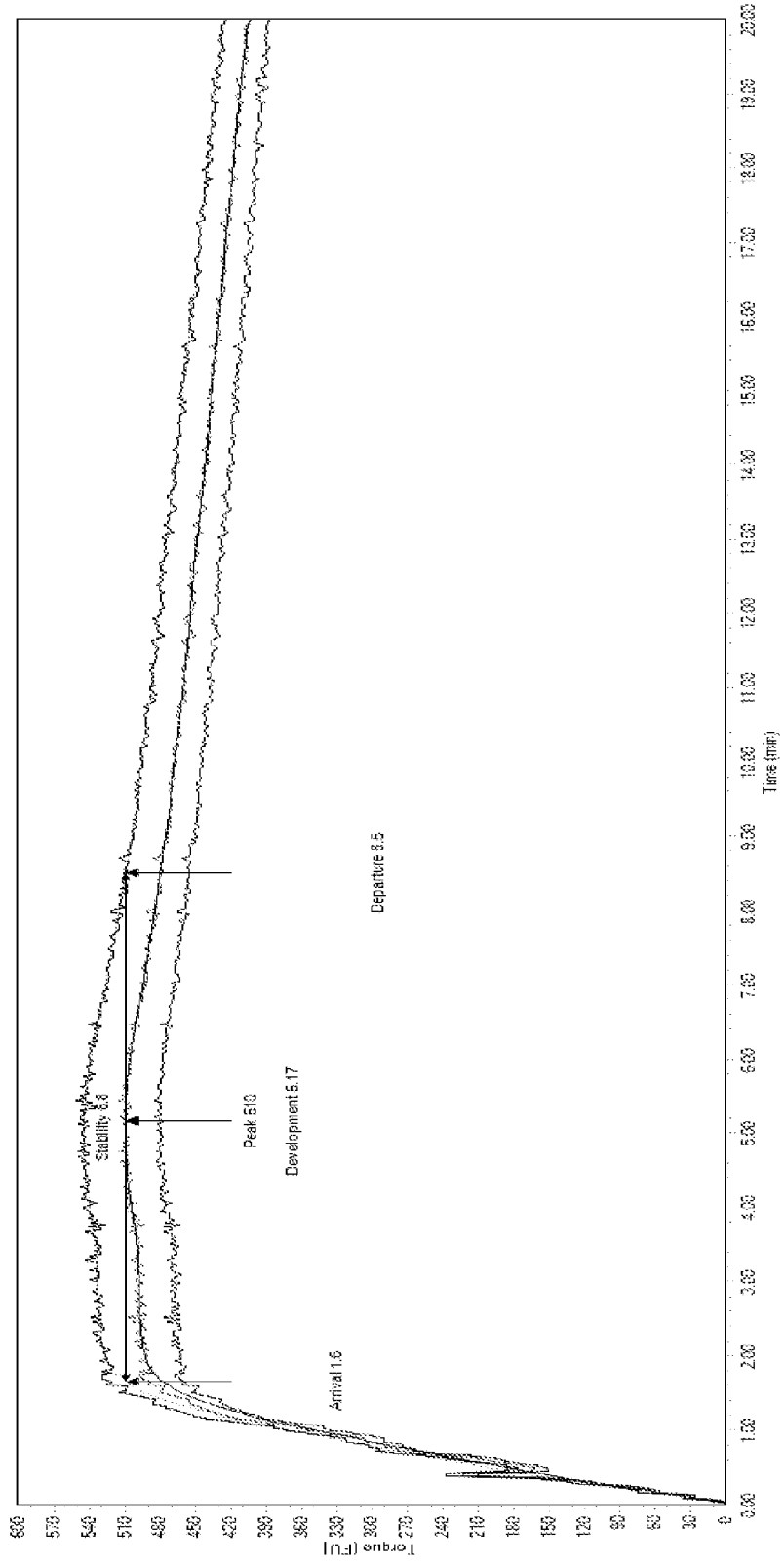

FIGS. 5A and 5B show Farinographs and flour water absorption results (dough viscosity at 30° C.) for whole wheat tortilla flour produced according to the invention (5A) versus conventional dehulled and degermed wheat flour (SELECTA®) (5B) The whole wheat flour produced according to the invention provided an increased yield and water absorption (99% w/w water) as compared to the dehulled and degermed SELECTA® wheat flour (60% w/w water) for the same apparent dough viscosity (500 FU). The whole wheat flour according to the invention has increased water absorption with a 60% reduction in stability time (6.8 to 2.8 minutes) without affecting viscoelastic performance for dough mixing and baking tortilla.

The water preconditioning and steam blanching steps performed according to embodiments of the present method allows for a reduction in water input and a reduction in energy demand compared to conventional blanching processes. As shown in Table 5, the present method provides at least about a 25% reduction in water input, and realistically about a 40% to 60% reduction in water input (i.e., about 0.20 to 0.45 cubic meter of water per ton of whole flour). The present method also provides at least about a 25% reduction in energy demand, and realistically about a 40% to 60% reduction in energy demand (i.e., about 0.50 to 0.90 Mbtu or GJ/ton of whole flour) as well as reduced carbon dioxide emissions (i.e., about 65 to 130 Kg of $CO_2$/ton of whole flour) as compared to conventional blanching processes that use more water not only for cooking but also for washing the grain. A conventional method for making dehulled wheat coarse flour is essentially as follows: cleaned wheat is soaked in water, cooked or blanched in water, dried, cooled, partially debranned and cracked (e.g., U.S. Pat. No. 3,778, 521).

TABLE 5

Comparison chart for Water, Energy and Wastewater

| Concept | Unit (per ton of flour) | Water-blanch (conventional) | Steam-blanch | Saving (%) |
|---|---|---|---|---|
| Water | M3 | 0.5-0.75 | 0.3 | 40-60 |
| Energy | MBtu (GJoule) | 1.0-1.5 | 0.5-0.9 | 40-65 |
| Wastewater | M3 | 0.3-0.6 | 0 | 100 |

From the foregoing, it will be apparent that it is possible to manufacture whole grain flour, such as whole wheat flour, and whole gluten-free flour, with steam blanching, using a continuous process that is water and energy efficient.

It is to be understood that the embodiments of this invention herein illustrated and described in detail and with published references are by way of illustration and not of limitation. Other changes and modifications are possible and will present themselves to those skilled in the art.

We claim:

1. A method for making whole grain flour, comprising continuously and repeatedly performing the following steps:
   providing a cleaned whole cereal grain kernel selected from the group consisting of wheat, barley, rye, oats, buckwheat, and combinations thereof, including endosperm, germ and bran components;

mixing the cleaned whole grain kernel with an aqueous solution to uniformly wet the kernel surface, said aqueous solution consisting of water and a sugar;

preconditioning the wet whole grain kernel to effect moisture adsorption to within a predetermined range;

blanching the moisturized preconditioned whole grain kernel in an atmosphere of saturated steam to at least partially gelatinize and denature the kernel components, and to hydrate with steam condensate the blanched kernel;

conditioning the blanched and hydrated kernel to stabilize the kernel to a desired moisture content;

milling the conditioned kernel to yield a bimodal mixture of a coarse-grind material and a fine-grind material;

hot-air drying the milled material, and cooling the material;

screening and classifying the cooled milled material to separate and recover a fine milled material of size under 45 US mesh to 230 US mesh as a whole grain flour, and to separate a coarse milled material of greater than 45 US mesh.

2. The method of claim 1, wherein the preconditioning step affects the moisture content of the kernel to a moisture range of 17% to 24%.

3. The method of claim 1, wherein the blanching step comprises utilizing saturated steam at an absolute pressure of from about 93.8 kPa to about 112.4 kPa, and hydrating said preconditioned whole kernel to a moisture content of about 26% to about 30% during 5 to 10 minutes.

4. The method of claim 1, wherein the conditioning step comprises cooling the kernel to stabilize the moisture content to a moisture range of about 25% to 28% during 40 to 60 minutes.

5. The method of claim 1, further comprising remilling the separated coarse milled material for further size reduction.

6. The method of claim 1, further comprising rehydrating said whole grain flour by mixing the flour with water in an amount of from about a 1:0.7 to about a 1:1.15 water to flour ratio to form a whole grain dough.

7. The method of claim 1, wherein the food grain is wheat.

8. The method of claim 1, wherein the fine milled material has a bimodal particle size distribution.

9. The method of claim 1, further comprising rehydrating said whole grain flour by mixing the flour with water in an amount from about a 1:0.9 to about a 1:1.25 water to flour ratio to form a whole grain dough.

10. An energy saving process for making whole grain legume flour, comprising continuously and repeatedly performing the following steps:

providing a cleaned whole legume seed including cotyledon and hull components;

mixing the cleaned whole legume seed with an aqueous solution to uniformly wet the seed surface, said aqueous solution consisting of water and a sugar;

preconditioning the wet whole legume seed to effect moisture adsorption to within a predetermined range;

blanching the moisturized preconditioned legume seed in an atmosphere of saturated steam to at least partially gelatinize and denature the seed components, and to hydrate with steam condensate the blanched seed;

conditioning the blanched and hydrated legume seed to stabilize the seed to a desired moisture content;

milling the conditioned legume seed to yield a bimodal mixture of a coarse-grind material and a fine-grind material;

hot-air drying the milled material, and cooling the material;

screening and classifying the cooled milled material to separate and recover a fine milled material of size under 45 US mesh to 230 US mesh as a whole grain legume flour, and to separate a coarse milled material of greater than 45 US mesh.

11. The method of claim 10, wherein the legume seed is selected from bean, lentil, chickpea, and combinations thereof.

12. The method of claim 10, wherein the preconditioning step affects the moisture content of the seed to a moisture range of 17% to 24%.

13. The method of claim 10, wherein the blanching step comprises utilizing saturated steam at an absolute pressure of from about 93.8 kPa to about 112.4 kPa, and hydrating said preconditioned whole seed to a moisture content of about 26% to about 30% during 5 to 10 minutes.

14. The method of claim 10, wherein the conditioning step comprises cooling the seed to stabilize the moisture content to a moisture range of about 25% to 28% during 40 to 60 minutes.

15. The method of claim 10, further comprising remilling the separated coarse milled material for further size reduction.

16. The method of claim 10, further comprising rehydrating said whole grain flour by mixing the flour with water in an amount of from about a 1:0.7 to about a 1:1.15 water to flour ratio to form a whole grain dough.

17. The method of claim 10, wherein the fine milled material has a bimodal particle size distribution.

18. The method of claim 10, further comprising rehydrating said whole grain flour by mixing the flour with water in an amount from about a 1:0.9 to about a 1:1.25 water to flour ratio to form a whole grain dough.

* * * * *